Aug. 25, 1964  K. R. KESKA  3,146,332
WELDING TRANSFORMER
Filed Dec. 6, 1961  2 Sheets-Sheet 1

INVENTOR.
KENNETH R. KESKA
BY
Oberlin, Maky & Donnelly
ATTORNEYS

Aug. 25, 1964     K. R. KESKA     3,146,332
WELDING TRANSFORMER

Filed Dec. 6, 1961     2 Sheets-Sheet 2

INVENTOR.
KENNETH R. KESKA
BY
Oberlin, Maky & Donnelly
ATTORNEYS

3,146,332
WELDING TRANSFORMER
Kenneth R. Keska, Bay Village, Ohio, assignor to The Yoder Company, Cleveland, Ohio, a corporation of Ohio
Filed Dec. 6, 1961, Ser. No. 157,456
2 Claims. (Cl. 219—63)

This invention relates to a transformer for seam welding and the like and has for a primary object the provision of an improved toroidal construction for such a transformer.

It has previously been proposed to provide a rotary welding transformer having a toroidal primary winding and core assembly, an annular secondary case surrounding said assembly, and electrode discs attached directly to such secondary respectively at the sides of a circumferential gap therein which defines the electrical ends of the single turn secondary. As will be appreciated, the transformer components are thus located, with appropriate mounting, directly at the work zone or the region of engagement of the electrodes with the work to be welded, instead of at a removed and more protected part of the machine. The last arrangement, which has been conventional in practice, requires of course that a conductor assembly be provided between the electrodes and the distal transformer secondary, and the elemination of such an intervening conductor assembly has been one of the primary objects of the noted other arrangement wherein the transformer components and electrodes are directly joined in a compact welder head.

It has been found, however, that such consolidation of the components, and the resulting increased exposure of the transformer elements and assembly to the work zone conditions, can present special problems of mechanical strength, rigidity, cooling, and generally protection against mechanical and electrical failure. The present invention provides a construction which is particularly improved in these respects and, accordingly, in durability and useful life of the equipment.

It is a more particular object to provide, principally by encapsulation, a toroidal rotary transformer of extremely rigid and rugged construction. The assembly of course comprises a number of structural elements in a particular design or arrangement and, according to the present improvements, the assembled elements are permanently bonded together in a rigid whole.

Another object is to eliminate any internal fluid cooling of the transformer, so that there are no sealing or other problems inherent in the common use of coolant within the structure or in the usual maintenance which such use involves.

Also in accordance with the invention, the primary and core are fully encapsulated in the secondary to provide positive protection against penetration of external moisture and impurities which would affect the electrical efficiency of and possibly damage the transformer.

Another object is to provide such an encapsulated transformer having extremely good heat dissipation properties, particularly for effecting transfer of heat from the interior region where the same is principally generated to the exposed exterior of the structure.

It is a further object of the present invention to provide a rotary welding head which can readily be mounted for rotation in working combination with support means therefor and also easily removed from the latter for substitution, replacement and the like.

Other objects and advantages of the invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
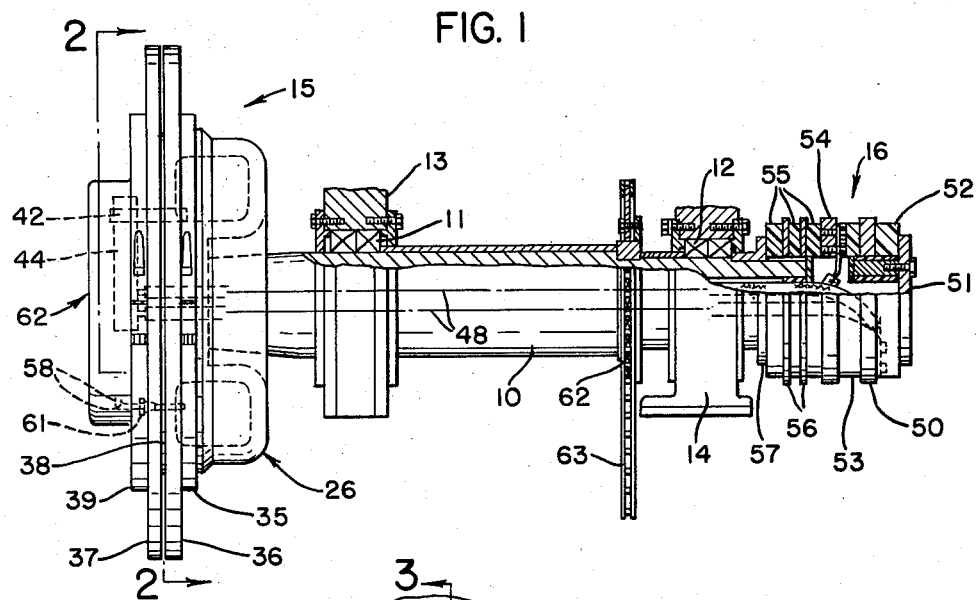
FIG. 1 is a side elevation of a welding transformer in accordance with the present invention, with a longitudinal portion thereof broken away.
Figure 2:
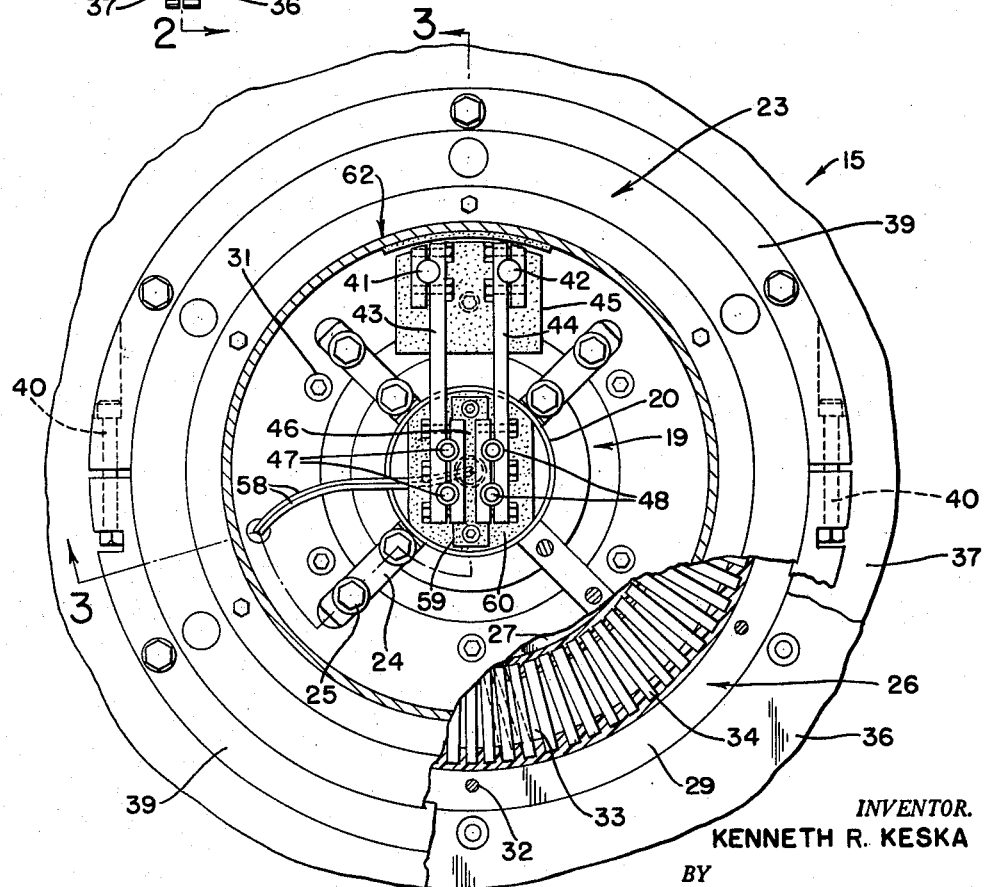
FIG. 2 is a transverse section of the transformer, on an enlarged scale, taken approximately on the line 2—2 in FIG. 1.
Figure 3:
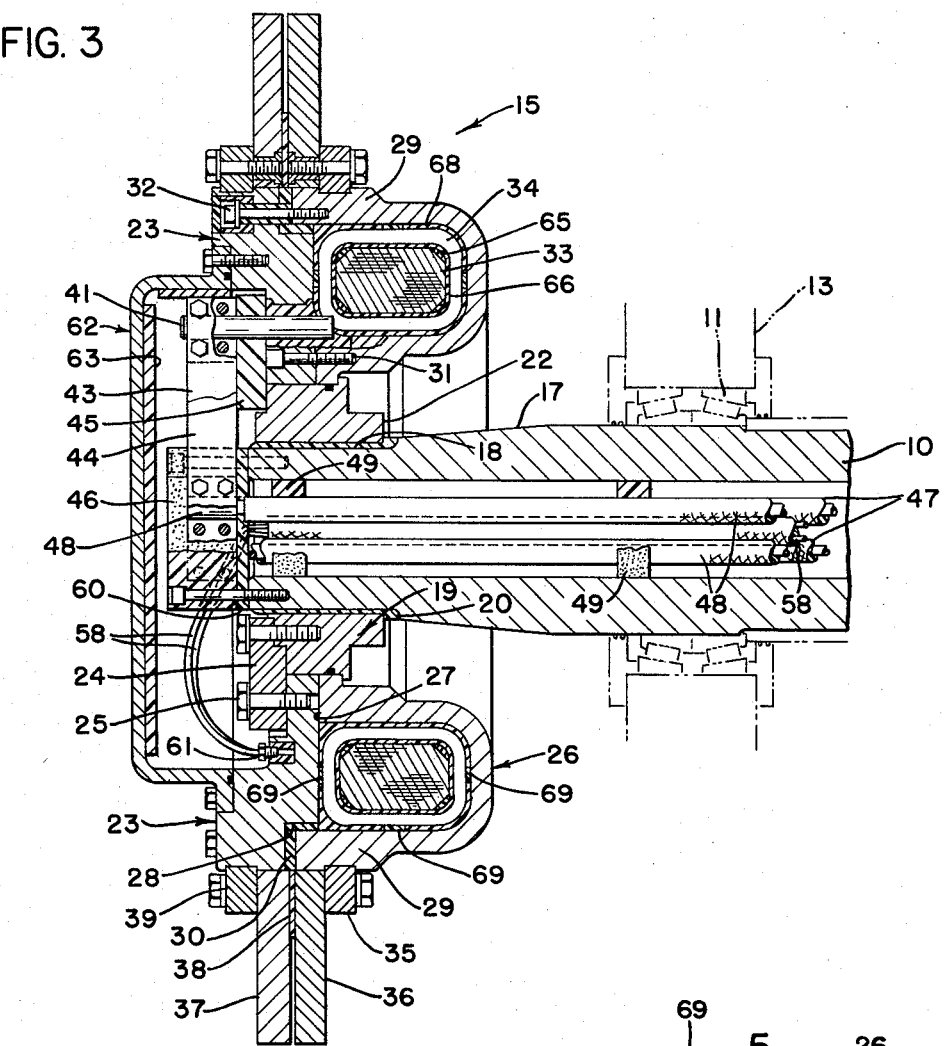
FIG. 3 is a further section on the line 3—3 in FIG. 2 and partially fragmented.

Referring now to the drawings in detail, the illustrated welding transformer comprises a hollow center shaft 10 supported horizontally and freely for rotation in a front bearing 11 and a rear bearing 12 respectively mounted in blocks 13 and 14. These bearing blocks are secured to suitable frame structure, not shown, preferably in such manner as to permit a degree of vertical adjustment of the horizontal shaft. The shaft projects beyond the bearings at both ends, with the welding head designated generally by reference numeral 15 mounted on the end of the shaft forward of the front bearing 11 and a slip ring assembly indicated generally by reference numeral 16 on the other projecting end of the shaft behind the rear bearing 12.

The forwardly projecting end of the shaft 10 which supports the welding head 15 is outwardly tapered as shown at 17 and terminates in a reduced cylindrical seat 18. An inner mounting ring 19 is fitted over such seat of the shaft and locked on the same by means of interposed insulative cement 20, which can be one of the synthetic resin adhesives.

A generally flat conductor ring 23 made of copper is placed on the forward end of the mounting ring. The ring 23 is held in place by a plurality of circumferentially spaced radial keys 24 bridging from the mounting ring 19 fixed on the shaft to the last conductor ring 23 and attached respectively to the same at their ends by screws 25. An annular secondary case 26 of general U-shaped in cross-section is located upon the mounting ring 19 to the rear of the conductor ring 23. The inner edge portion 27 of this case abuts the rear face of the conductor ring 23, while the latter is provided with an outer peripheral notch 28 partially to receive the opposed outer edge portion 29 of the case in spaced relation. Electrical insulation 30 is placed between such outer opposed portions of the ring and case, and inner and outer series of circumferentially spaced screws 31 and 32, respectively, are passed through the ring 23 and into the edge portions of the case 26 to secure the two together. The outer screws 32 are insulated from the ring 23 by non-conductive spacers about the shanks and insulating washers about the heads in recesses provided for the same in the outer face of such ring. An insulating plug is cemented into each recess against the screw head in the same.

The case 26 is made of copper and with ring 23 serves as the secondary of the welding transformer. A unitary core-primary assembly comprising a laminated iron core 33 and a primary coil 34 wrapped thereabout in one or more layers is housed within the case, with the details of this assembly and mounting to be described hereinbelow.

The outer edge portion 29 of the secondary case has a groove in which a rear electrode collar 35 is seated, and a rear or inner electrode 36 of ring form is engaged on the secondary case against such rear collar, with attaching screws passed through the collar from the rear into threaded engagement with steel inserts in the electrode. An outer ring electrode 37 is engaged on the ring 23, with an insulative seal gasket 38 between the two electrodes, and a forward electrode collar 39 is disposed against the forward face of the outer electrode in a peripheral groove provided in the ring 23. The outer electrode is secured to the forward collar by screws passing through the former into steel inserts in the latter, and both collars are formed from semi-circular pieces interconnected at their ends by non-magnetic screws 40.

Two copper terminal pins 41 and 42 extend through close-spaced transverse openings in the ring 23, with insulation about the pins, and the latter are electrically connected at their inner ends to the ends of the primary winding 34. At their outer ends the pins are clamped respectively in copper conductor bar devices 43 and 44 which extend inwardly over the open end of the center shaft 10. A first insulating pad 45 is placed between such bars and the outer face of the ring 23 where the terminals 41 and 42 emerge from the latter, while other insulating pads 46, 59 and 60 are disposed between and behind the inner end portions of the bars. A pair of insulated conductors 47 is clamped, by a block and screws, to the inner end portion of the bar 43 and extends rearwardly through the center shaft. Another pair of similar conductors 48 is connected to the other terminal bar 44 by block and screws and also extends to the interior of the shaft. Insulative spacer rings 49 generally center the several conductors within the shaft.

The conductors 48 extend to the rear of the shaft 10 and, passing through the wall of the same, are both connected to a copper slip ring 50 fixed on the shaft but insulated from the same. Such other end of the shaft is closed by an end plate 51 and slip ring 50 is spaced inwardly from such plate by an insulator ring 52. A further insulating spacer 53 is disposed about the shaft at the forward side of the slip ring 50, and a further copper slip ring 54 is mounted on the shaft against this last spacer. The conductors 47 are both connected to the further slip ring 54, whereby the rings 50 and 54 are respectively connected to the ends of the primary transformer winding. It is not necessary that plural conductors be employed for such connection, the conductors shown being of standard available size which should desirably be paired to carry the applied current.

A control slip ring assembly comprising three insulative spacers 55 and two control slip rings 56 is mounted on the shaft forward of the current supply slip ring 54 in insulated relation. A flanged spacer 57 on the shaft extending from the rear bearing against the last or forward insulative ring 55 completes this end terminal section of the welder. As indicated, the slip rings 56 are used for a control purpose and insulated wires 58 extend respectively therefrom through the shaft 10 to the head 15 and to connections with a temperature responsive switch 61 in an opening of the ring 23. This switch is, as shown, in contact with the ring 23 and therefore responsive to the temperature of the same. By virtue of this control, the current supply to the welder can automatically be interruped in the event that the temperature should for any reason become excessive. Both the current slip rings and the control slip rings will of course be engaged by brushes, not shown, for energizing the transformer and for connection of the temperature switch in an appropriate external control circuit. The welding head is provided with a moisture tight cover 62, preferably made of aluminum and having an insulating pad 63 against its inner surface, with this cover being attached to the face of the ring 23 and enclosing the terminal assemblies and the temperature switch.

In the construction shown, a sprocket 62 is keyed on and insulated from the shaft 10 between the bearings, and a chain 63 is engaged thereabout for positive rotation of the assembly by means of an external drive when desired, for example, to dress or trim the electrodes.

Figure 4:
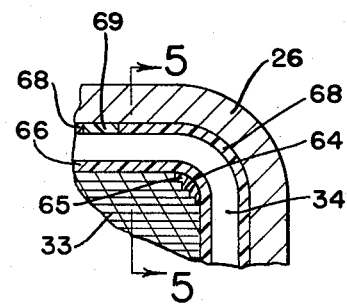
FIG. 4 is a fragmentary longitudinal section of a portion of the transformer on a further enlarged scale.
Figure 5:
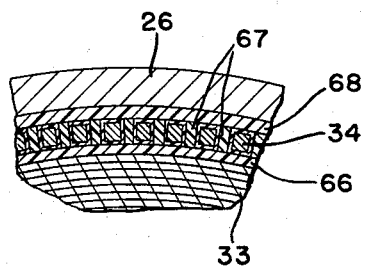
FIG. 5 is another fragmentary section the plane of which is indicated by the line 5—5 in FIG. 4.

Returning now to the details of the core and winding assembly of the new transformer, the core 33 is ribbon wound, or made of rings of different diameters, with varying width to obtain stepped corners, as best shown at 64 in FIG. 4. A high temperature putty 65, such as a polyester or epoxy putty, is then applied to the corners for rounding of the same, and insulation 66 is applied to the exterior of the core. This insulation preferably comprises several wrappings of glass tape, with one or more layers carrying resin, and the thus wrapped core is vacuum impregnated with an epoxy resin and cured.

An epoxy enameled wire having an overcoating of epoxy-type cement is preferably used for the primary winding 34 and wound about the insulated core. Heat is applied to bond the cement coated wire to the core, the terminal pin connections of the primary are made, and then the spaces 67 between the primary turns are filled with the polyester or epoxy putty. Insulation 68 is next applied to the exterior of the wound primary, preferably provided by wrapping glass tape about the assembly as in the case of the core insulation. After the application of this insulation, the primary is vacuum impregnated with epoxy in place and assembled "wet" before curing in the secondary case 26, with insulative spacers 69 preferably applied at a series of points to the exterior of the insulated primary. After such insertion and application of ring 23 to the case 26, the assembly is again subjected to vacuum impregnation with the epoxy and cured; the resin may for example be added through the relatively enlarged openings in the ring 23 which accommodate the pins 41, 42.

The resins thus used will be of commercially available electrical quality, and it will be seen that the result of the described manufacture and assembly of the transformer components is full encapsulation of the core-primary device within the secondary case. That is, there are no voids left within the assembly, with the components individually insulated and then permanently bonded by further insulating material. A transformer unit is thus provided which is positively protected against the entrance of moisture and other impurities, and extreme rigidity is self-evident. It has further been found that the solid dielectric between the primary and secondary can be quite thin, on the order of .070 inch, without the usual concern for such close spacing and with improved transformer coupling.

The above-discussed materials, together with the close spacing noted, provide good thermal coupling as well, so that the heat generated within the primary is readily transferred to the secondary case. The latter is fully exposed on three sides and, being completely sealed, water or other coolant can safely be sprayed or otherwise applied to the exterior of the case for extraction of the heat from the same.

The thermal conductivity of the insulation in the assembly is thus a material factor in addition to the physical form, temperature stability and high dielectric strength of the material or materials used, and the first-noted characteristic can be further enhanced to satisfy conditions of use which would be more demanding in such respect by incorporation of suitable metallic oxides in the assembly. For such purpose, the spaces 67 between the primary turns can be filled with a putty made from resinous material and a filler material of greater thermal conductivity, such as beryllium oxide powder and uncured epoxy, in lieu of the polyester or epoxy putty mentioned earlier, or blocks of beryllium oxide or aluminum oxide can be wedged in such spaces. Similarly, the insulation 68 can be formed from the metallic oxide containing powder or such blocks; a coating of beryllium oxide could also be applied, for example, by spraying, to the interior of the secondary case 26 to form the insulation 68. The several steps here noted would of course be appropriately accomplished before the final vacuum impregnation of the assembly with the epoxy, and the metallic oxides or other fillers used will possess the usual electrical insulation characteristics as well as the desired high thermal conductivity.

It will also be seen that the assembly of the heat 15 is such to permit ready removal thereof from the shaft 10. The entire transformer, including the electrodes in place, can be removed by taking off the cover 62, disconnecting the conductors, and removing the screws 25 securing the assembly to the shaft ring 19. The head can then be balanced by a crane and the like and slidably withdrawn from the end of the shaft.

This application is a continuation-in-part of my co-pending applications Serial No. 109,599, filed May 12, 1961.

Other modes of applying the principle of the invention may be employed, change being made as regards the details described, provided the features stated in any of the following claims or the equivalent of such be employed.

I, therefore, particularly point out and distinctly claim as my invention:

1. A rotary welding transformer comprising a single-turn secondary winding in the form of an annular conductive assembly of hollow cross-section, said secondary having a circumferential gap therein defining the electrical ends of said winding, a pair of rotary welding electrodes extending substantially directly outwardly from such respective electrical ends of said secondary winding, a primary toroidal winding fully enclosed in close spaced relation by said secondary winding, electrical insulation means cast in place between said primary winding and said secondary winding to permanently bond and seal said primary winding to said secondary winding and thereby form a rigid unit, said electrical insulation filling all spaces between said primary winding and said secondary winding, and support means engaging the radially inner side of said annular conductive assembly to support said transformer for rotation about its axis, said support means thus engaging only a limited axial portion of said annular conductive assembly and said assembly in consequence being substantially exposed at all sides to the atmosphere for dissipation of heat therefrom.

2. A transformer in accordance with claim 1, wherein said electrical insulation is resinous in character and includes an electrically non-conductive filler of substantially greater thermal conductivity than that of said resin.

References Cited in the file of this patent

UNITED STATES PATENTS

| | | |
|---|---|---|
| 1,979,882 | Hunter | Nov. 6, 1934 |
| 2,052,963 | Caputo | Sept. 1, 1936 |
| 2,132,196 | Von Henke | Oct. 4, 1938 |
| 2,265,627 | Caputo | Dec. 9, 1941 |
| 2,388,042 | Daily | Oct. 30, 1945 |
| 2,618,689 | Cook | Nov. 18, 1952 |
| 2,972,783 | Russell et al. | Feb. 28, 1961 |
| 2,993,109 | Tudbury | July 18, 1961 |
| 3,030,597 | Piaia et al. | Apr. 17, 1962 |